United States Patent
Yamada et al.

[19]

[11] Patent Number: 5,934,880
[45] Date of Patent: Aug. 10, 1999

[54] FLUID PRESSURE SOURCE APPARATUS FOR PROVIDING ADEQUATE ACCUMULATOR PRESSURE DURING PRESSURE FAILURE

[75] Inventors: Satoshi Yamada, Anjyo; Shinsuke Sakane, Chita-gun, both of Japan

[73] Assignee: Aisin Seiki Kabushiki Kaisha, Kariya, Japan

[21] Appl. No.: 08/975,355

[22] Filed: Nov. 20, 1997

[30] Foreign Application Priority Data

Nov. 20, 1996 [JP] Japan .................................. 8-309681

[51] Int. Cl.⁶ .................................................. F04B 49/02
[52] U.S. Cl. .............................. 417/38; 303/122; 303/10; 303/122.05
[58] Field of Search .................................. 303/109, 106, 303/100, 119, 10, 117.1, 95, 119.2, 92, 110, 52, 116; 417/38

[56] References Cited

U.S. PATENT DOCUMENTS

| | | | |
|---|---|---|---|
| 4,880,282 | 11/1989 | Makino et al. | 303/116 |
| 5,221,125 | 6/1993 | Okochi et al. | 303/10 |
| 5,413,404 | 5/1995 | Inagawa | 303/92 |

*Primary Examiner*—Timothy S. Thorpe
*Assistant Examiner*—Robert Z. Evora
*Attorney, Agent, or Firm*—Burns, Doane, Swecker & Mathis, L.L.P.

[57] ABSTRACT

A fluid pressure source apparatus has a pump, an accumulator, a pressure switch, and a control device for turning on and off the pump in accordance with the signal from the pressure switch. The control device has a pressure increase control unit. When the pressure detection signal of the pressure switch indicates a high pressure, the pressure increase control unit estimates a pressure reduction N resulting from a fluid pressure consumption by a fluid pressure circuit. If the estimated amount of pressure reduction N exceeds a set value KN=KN1, KN2, the pressure increase control unit drives the pump for a set time KT=KT1, KT2, thereby ensuring a predetermined range of accumulator pressure despite a possible failure of the pressure switch or sensor.

13 Claims, 8 Drawing Sheets

SWITCH CLOSES WHEN HIGH PRESSURE
SWITCH OPENS WHEN LOW PRESSURE

(b)

PRESSURE DETECTION SIGNAL OF PH

Fig. 8 ced. 5,934,880

FLUID PRESSURE SOURCE APPARATUS FOR PROVIDING ADEQUATE ACCUMULATOR PRESSURE DURING PRESSURE FAILURE

FIELD OF THE INVENTION

The present invention generally relates to a fluid pressure source apparatus. More particularly, the present invention pertains to a fluid pressure source apparatus that accumulates pressure in an accumulator using a fluid pump and provides the pressure fluid from the accumulator to a fluid circuit.

BACKGROUND OF THE INVENTION

Vehicles equipped with a hydraulic booster and an anti-lock braking system or vehicles equipped with an active suspension system have a fluid pressure source apparatus for supplying an operating pressure (high pressure). The fluid pump of the fluid pressure source apparatus is driven by an electric motor or a vehicle engine via a clutch.

A conventional fluid pressure source apparatus is disclosed in U.S. Pat. No. 5,221,125. In this apparatus, fluid from a reservoir is pressurized by a fluid pump driven by a motor and is then discharged into a high pressure line. An accumulator is connected to the high pressure line to accumulate the fluid pressure discharged by the pump.

A high pressure-side pressure switch and a low pressure-side pressure switch are connected to the high pressure line. Pressure detection signals generated by the pressure switches are inputted to an electronic control unit. Both the pressure switches have hysteresis characteristics. When the pressure detection signal indication from the high pressure-side pressure switch turns from high pressure to low pressure, the electronic control unit drives the fluid pump through operation of an electric motor. When the pressure detection signal indication from the high pressure-side pressure switch turns from low pressure to high pressure, the electronic control unit stops driving the fluid pump. Because the pressure (normal lower limit pressure) at which the pressure detection signal indication from high pressure to low pressure is lower than the pressure (normal upper limit pressure) at which the signal indication turns from low pressure to high pressure, the pressure in the accumulator is maintained between the normal lower limit pressure and the normal upper limit pressure.

The low pressure-side pressure switch is used to detect an excessive or abnormal drop of the pressure in the accumulator. If the pressure in the accumulator falls to a level (abnormal lower limit pressure) that is lower than the normal lower limit pressure, the low pressure-side pressure generates a pressure detection signal indicating "low pressure" and the electronic control unit outputs a warning.

As long as the high pressure-side pressure switch is normally functioning so that based on the pressure detection signal therefrom the electronic control unit normally controls the driving of the fluid pump, the accumulator pressure does not fall to the abnormal lower limit pressure. However, if the high pressure-side pressure switch fails, that is becomes unable to output a pressure detection signal indicating low pressure (lower than the normal lower limit pressure), the fluid pump is not driven even though the accumulator pressure is below the normal lower limit pressure. Further, because the electronic control unit does not operate the fluid pump even though the pressure detection signal from the low pressure-side pressure switch indicates "low pressure", the pressure in the accumulator falls below the abnormal lower limit pressure. As a result, a minimum pressure required in the accumulator cannot be achieved.

SUMMARY OF THE INVENTION

Accordingly, a need exists for a fluid pressure source apparatus that ensures a minimum pressure level required in an accumulator even during failure of a pressure switch.

A need also exists for a fluid pressure source apparatus that can be produced at a relatively low cost.

According to an aspect of the invention, a fluid pressure source apparatus includes a fluid pump, an accumulator which receives pressure from the fluid pump, and a pressure switch for detecting either the pressure in the accumulator or the pressure in a fluid pressure line communicating with the accumulator. A pump control device is provided for driving the fluid pump when a pressure detection signal from the pressure switch indicates a low pressure. When the pressure detection signal from the pressure switch indicates a high pressure, a pressure increase control device calculates an estimate of the pressure reduction in the fluid pressure line resulting from fluid pressure consumption in the fluid circuit connected to the fluid pressure line. The pressure increase control device drives the fluid pump for a set length of time when the estimate exceeds a set value.

As long as the pressure switch normally outputs the pressure detection signal, the pressure in the accumulator is maintained at a level equal to or higher than a set pressure by controlling the driving of the fluid pump performed by the pump control device in response to the pressure detection signal. If the pressure switch fails and becomes unable to output the pressure detection signal indicating a low pressure, the pressure increase control device calculates an estimate of pressure reduction in the fluid pressure line resulting from a fluid pressure consumption in the fluid circuit connected to the fluid pressure line. When the estimate exceeds the set value, the pressure increase control device drives the fluid pump for a set length of time.

Therefore, even if the pressure switch fails so that maintenance of a high accumulator pressure based on the detection signal from the pressure switch becomes impossible, a certain accumulator pressure is secured because the pressure increase control device automatically drives the fluid pump when the pressure in the fluid pressure line decreases to a certain level. The construction of the fluid pressure source apparatus requires no additional pressure switch or pressure sensor and, therefore, can be produced at a relatively low cost.

The pressure increase control device may be designed to count the number of operations during which high fluid pressure is supplied to a load provided in the fluid pressure circuit, while the pressure detection signal from the pressure switch indicates the high pressure. When the count value exceeds a set value, the pressure increase control device drives the fluid pump for a set length of time and resets the count value.

With this optional construction, while the pressure detection signal from the pressure switch remains indicative of a high pressure, the fluid pump is driven to add an accumulator pressure for the set length of time, every time the number of pressure supplying operations equivalent to the set value is reached. Therefore, a certain accumulator pressure is substantially continuously secured.

According to another aspect of the invention, a fluid pressure source apparatus includes a fluid pump, an accumulator receiving pressure from the fluid pump, a pressure switch for detecting either the pressure in the accumulator or the pressure in a fluid pressure line communicating with the accumulator, and a fluid circuit for supplying the fluid pressure in the fluid pressure line to a load. A load operation detecting device is provided for detecting application of a fluid pressure to the load from the fluid circuit. When a pressure detection signal from the pressure switch indicates a high-pressure, a counting device counts the number of operations during which fluid pressure is applied to the load as detected by the load operation detecting device. A first pressure increase control device drives the fluid pump when the pressure detection signal from the pressure switch indicates a low pressure. When the count value of the counting device exceeds a set value, a second pressure increase control device drives the fluid pump for a set length of time and resets the count value of the counting device.

As long as the pressure switch normally outputs the pressure detection signal, the pressure in the accumulator is maintained at a level equal to or higher than a set pressure by controlling the driving of the fluid pump which is performed by the pump control device in response to the pressure detection signal. If the pressure switch fails and becomes unable to output the pressure detection signal indicating a low pressure, the counting device counts the number of operations during which fluid pressure is applied to the load. When the number exceeds a set value, the second pressure increase control device drives the fluid pump for a set length of time, and resets the count value of the counting device.

Because the fluid pump is driven to add an accumulator pressure for the set length of time every time the number of pressure supplying operations equivalent to the set value is reached, a certain accumulator pressure is substantially continuously secured. The construction of the fluid pressure source apparatus requires no additional pressure switches or pressure sensors and, therefore, can be produced at a relatively low cost.

The fluid pressure source apparatus may be constructed so that when the count value of the counting device exceeds a first set value which is an initial value of the set value, the second pressure increase control device drives the fluid pump for a first set length of time which is an initial value of the set length of time, and resets the count value of the counting device. Further, when the count value of the counting device exceeds a second set value which is another value of the set value, the second pressure increase control device drives the fluid pump for a second set length of time which is another value of the set length of time, and resets the count value of the counting device. The values are predetermined values having a particular relationship.

BRIEF DESCRIPTION OF THE DRAWING FIGURES

The foregoing and additional features and details associated with the present invention will become more apparent from the following detailed description considered with reference to the accompanying drawing figures in which like reference numerals are used to represent like elements and wherein.

DETAILED DESCRIPTION OF THE INVENTION

The apparatus according to the present invention is usable as a high brake pressure source of a brake circuit for supplying brake pressure to wheel brakes of a vehicle and/or a hydraulic booster for supplying brake pressure to vehicle wheel brakes. The apparatus is also usable as a high pressure source in a liquid pressure circuit for supplying a vehicle suspension with a pressure for supporting the vehicle.

Figure 1:
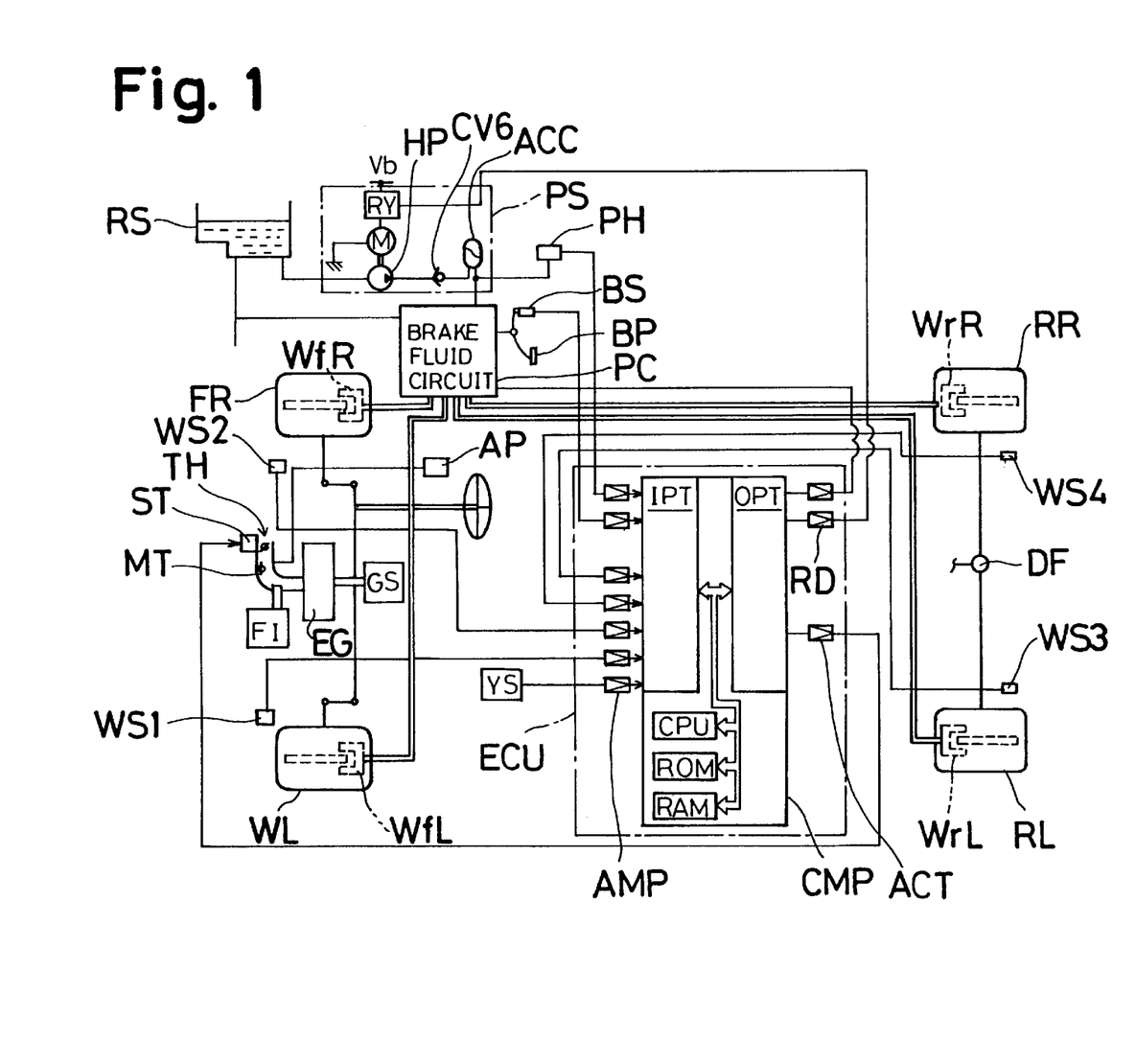
FIG. 1 is a schematic illustration of the wheel brake pressure control apparatus equipped with the fluid pressure source apparatus of the present invention.

FIG. 1 illustrates the overall construction of a vehicle installed wheel brake pressure control apparatus incorporating a fluid pressure source apparatus according to the present invention. An engine EG in the form of an internal combustion engine is equipped with a throttle control device TH and a fuel injection device Fl. The throttle control device TH controls the opening of a main throttle valve MT in accordance with the operation of an accelerator pedal AP.

The throttle control device TH drives a sub-throttle valve ST in accordance with the output from an electronic control unit ECU and thereby controls the opening of the sub-throttle valve ST. The fuel injection device FI is simultaneously driven in accordance with the output from the electronic control unit ECU to thereby control the amount of fuel injected. The engine EG is connected to wheels RL, RR at the rear of the vehicle via a gear speed shift control GS and a differential gear unit DF.

Wheel cylinders WfL, WfR, WrL, WrR associated with wheel brakes are disposed with respect to the corresponding wheels FL, FR, RL, RR. The wheel cylinders WfL, WfR, WrL, WrR are connected to a brake fluid pressure circuit PC. The wheel designated FL represents a front left wheel as viewed from the driver's seat, the wheel designated FR represents a front right wheel as viewed from the driver's seat, the wheel designated RL represents a rear left wheel as viewed from the driver's seat, and the wheel designated RR represents a rear right wheel as viewed from the driver's seat.

Each of the wheels FL, FR, RT, RR is equipped with a respective pulse generator WS1–WS4 for generating an electric signal pulse for every predetermined small rotational angle of each wheel. The electric signal pulses from the pulse generator WS1–WS4 are inputted to the electronic control unit ECU. A microcomputer CMP of the electronic control unit ECU performs an interrupt processing operation in response to each pulse outputted from, for example, the pulse generator WS1, writes the value of the presently measured time (clock pulse count value) in a pulse interval register for the pulse generator WS1, restarts the counting of the clock pulses. In this way, the pulse interval register for the pulse generator WS1 always has written data indicating the latest interval of pulses generated by the pulse generator WS1. To determine a rotating speed VwfL of the wheel FL, the microcomputer CMP multiplies the inversion of a value indicated by the data written in the pulse interval register for the pulse generator WS1 by a proportionality factor. Substantially the same type of interrupt processing is performed for pulses generated by the other pulse generators WS2, WS3, WS4 so that the rotating speeds VwfR, VwrL, VwrR of the wheels FR, RL, RR are calculated in a similar manner.

The electronic control unit ECU is also connected to various sensors and switches including a brake switch BS that turns on when a brake pedal BP is depressed, a pressure switch PH for detecting a high level and a low level of the pressure output from an accumulator ACC, and a yaw rate sensor YS for detecting the yaw rate of the vehicle. The yaw rate sensor YS detects a changing speed of vehicle rotational angle (yaw angle) around a vehicle axis passing through the vehicle's center of gravity (i.e., the yaw angle rate or yaw rate) and outputs to the electronic control unit ECU an electric signal indicating the yaw rate. When inputting a yaw rate, the microcomputer CMP digitally converts the electric signal from the yaw rate sensor YS and inputs the digital data.

The microcomputer CMP of the electronic control unit ECU includes a microprocessor (CPU), a read-only memory (ROM), a random-access memory (RAM), input ports IPT and output ports OPT as shown in FIG. 1.

Output signals from, for example, the brake switch BS, the pressure switch PH, the pulse generators WS1–WS4 and the yaw rate sensor YS are inputted, via amplifiers AMP, to their respective input ports IPT and then to the A/D converting ports of the CPU. The CPU reads the levels of the output signals in the form of the converted digital data. The CPU outputs a relay-on signal (for driving the pump through energization of the motor) or a relay-off signal (for stopping the pump by turning off the motor) from the output ports OPT to a relay driver RD. While the relay-on signal continues, the relay driver RD continues to supply electricity to a relay coil of a relay RY. The contacts of the relay RY are thereby closed to supply electricity to an electric motor M. Furthermore, the CPU outputs a control signal from the output port OPT to solenoid drivers that energize solenoid valves (12 valves) of the brake fluid pressure circuit PC. The CPU also outputs a control signal for the throttle control device TH, to a motor driver ACT provided for the electric motor that operates the sub-throttle MT of the throttle control device TH.

The ROM of the microcomputer CMP stores control programs for executing various operations described below and data such as fixed constants and the like. The CPU executes programs while an operating voltage is being supplied to the CPU from a power circuit which starts when an ignition switch is closed. The RAM temporarily stores programs read from the ROM, data from the ROM, data inputted through the input ports, and data generated by the CPU.

Figure 2:
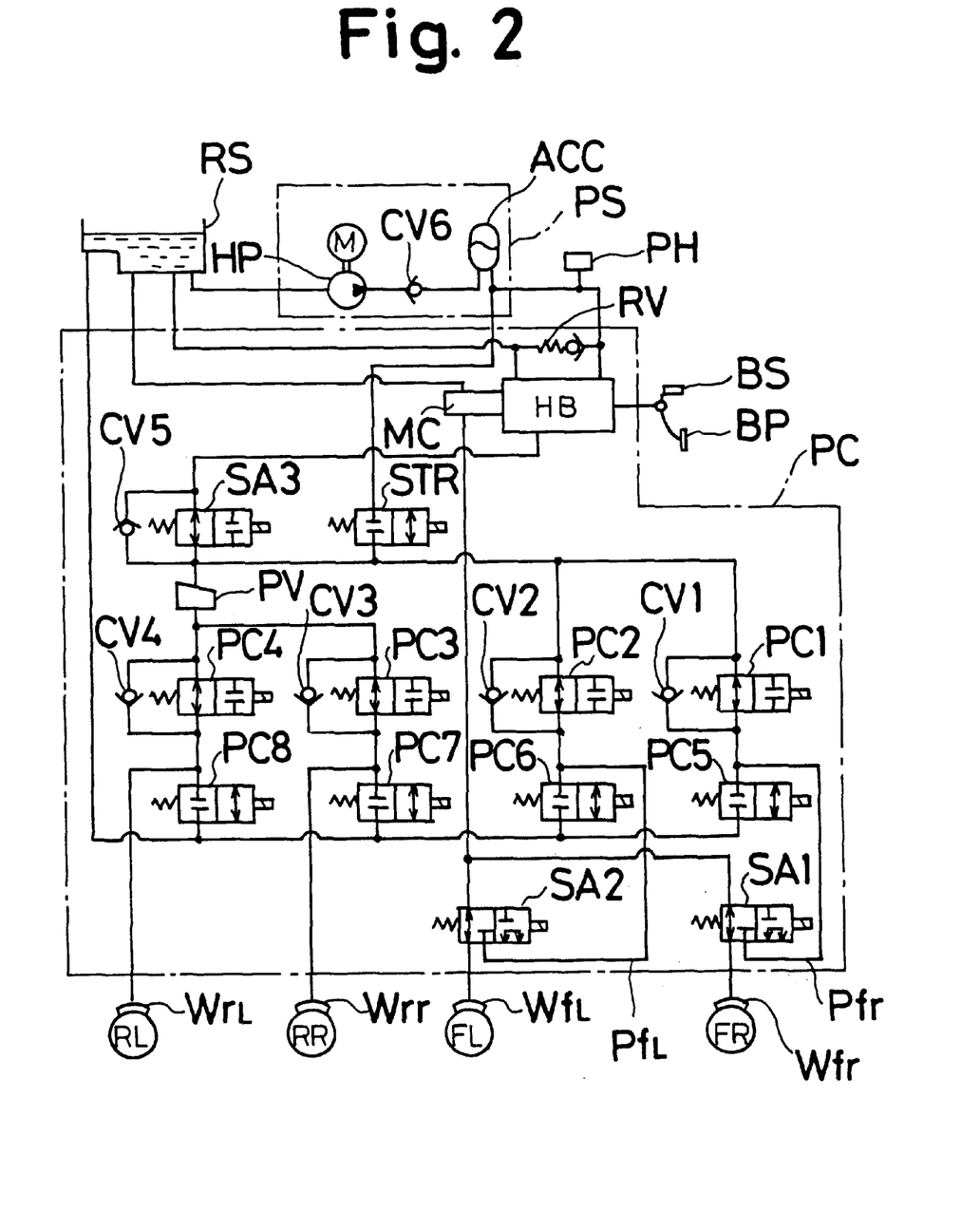
FIG. 2 is a schematic illustration of the brake fluid circuit shown in FIG. 1.

FIG. 2 shows the construction of the brake fluid pressure circuit PC used in the vehicle wheel brake pressure control apparatus shown in FIG. 1. When the brake pedal BP is depressed, a hydraulic booster HB generates a pressure substantially proportional to the depressing pressure to thereby drive the piston of a master cylinder MC. The hydraulic booster HB is connected to a fluid pressure source PS. The fluid pressure source PS includes a fluid pressure pump HP, the drive motor M, and an accumulator ACC. A relief valve RV is disposed between the accumulator ACC and a low pressure reservoir RS. The fluid pressure pump HP is driven by the electric motor M to draw brake fluid from the low pressure reservoir RS, to pressurize the fluid, and to send the pressurized fluid to the accumulator ACC via a check valve CV6. The CPU monitors the ON/OFF (high/low pressure) of the pressure switch PH for detecting the pressure in the accumulator ACC or in the pressure supply line connected to the accumulator ACC. When the pressure switch PH switches from the on-state to the off-state, the CPU drives the electric motor M through the relay driver RD to thereby increase the fluid pressure in the accumulator ACC.

Even if the pressure switch PH is not able to switch to the low-pressure side, the CPU starts to drive the electric motor M through the relay driver RD when the number of open-close operations of the brake switch BS, which is operated by depressing the brake pedal BP, reaches a predetermined number. The fluid pressure in the accumulator ACC is thereby increased. When a predetermined length of time elapses after the start of driving of the electric motor M, the CPU stops driving the electric motor M through the relay driver RD. Through the drive control by the CPU, the fluid pressure in the accumulator ACC is always maintained within a predetermined range.

The hydraulic booster HB generates an output pressure proportional to the depressing pressure (control pressure) of the brake pedal BP from a source pressure which is an output pressure of the fluid pressure source PS (i.e., the fluid pressure in the accumulator ACC). The master cylinder MC is thus driven by a boosted power.

Solenoid changeover valves SA1, SA2 are disposed in respective front wheel-side fluid pressure circuits extending between and connecting the master cylinder MC and the front wheel cylinders WfR, WfL. The solenoid changeover valve SA1 is connected to solenoid on-off valves PC1, PC5 by a control pressure line PfR. Similarly, the solenoid changeover valve SA2 is connected to solenoid on-off valves PC2, PC6 by a control pressure line PfL. A solenoid on-off valve SA3 and a plurality of supply/discharge controlling solenoid on-off valves PC1–PC8 are disposed in fluid pressure lines extending between and connecting the hydraulic booster HB and the wheel cylinders WfR, WfL, WrR, WrL. The rear wheel-side fluid pressure circuit is provided with a proportional pressure reducing valve PV. Fluid pressure from the fluid pressure source PS is supplied to the downstream side of the solenoid on-off valve SA3 via a solenoid on-off valve STR.

In the front wheel-side hydraulic system, the solenoid on-off valves PC1, PC2 are connected to the solenoid on-off valve STR. The solenoid on-off valve STR is a two-port two-position solenoid on-off valve that is closed to prevent flow when its associated electric coil is not energized or operated (OFF). The solenoid on-off valve STR opens to allow flow when its associated electric coil is energized or operated (ON). When the solenoid on-off valve STR is open, the solenoid on-off valves PC1, PC2 communicate with the accumulator ACC.

The solenoid changeover valves SA1, SA2 are three-port two-position solenoid changeover valves. Each of the solenoid changeover valves SA1, SA2 assumes a first position as shown in FIG. 2 when its associated electric coil is not energized or operated (OFF). In this state, the corresponding front wheel cylinder WfR or WfL communicates with the master cylinder MC. When the electric coil is energized or operated (ON), the solenoid changeover valve switches to a second position so that the corresponding wheel cylinder WfL or WfR is disconnected from the master cylinder MC and instead is brought into communication with the solenoid on-off valves PC1 and PC5 or the solenoid on-off valves PC2 and PC6.

A check valve CV1 is connected in parallel to the solenoid on-off valve PC1 while a check valve CV2 is connected in parallel to the solenoid on-off valve PC2. The flow-in side of the check valve CV1 is connected to the control pressure line PfR while the flow-in side of the check valve CV2 is connected to the control pressure line PfL. The check valve CV1 is provided to cause the brake fluid pressure of the front right-wheel cylinder WfR to quickly follow a decrease of the output pressure of the hydraulic booster HB when the brake pedal BP is released while the solenoid changeover valve SA1 is ON (i.e., is in the second position). That is, the check valve CV1 allows brake fluid to flow toward the hydraulic booster HB, but prevents brake fluid flow in the opposite direction. Likewise, the check valve CV2, provided for the front left wheel cylinder WfL, allows brake fluid to flow toward the hydraulic booster HB, but prevents brake fluid flow in the opposite direction.

The solenoid on-off valve SA3 in the rear wheel-side hydraulic system is a two-port two-position solenoid on-off valve that is opened to allow flow as indicated in FIG. 2 when its associated electric coil is not energized or operated (OFF) so that the solenoid on-off valves PC3, PC4 communicate with the hydraulic booster HB via the proportional pressure reducing valve PV. In this state, the solenoid on-off valve STR is closed (OFF) as indicated in FIG. 2 so that the proportional pressure reducing valve PV is disconnected from the accumulator ACC. When the solenoid on-off valve SA3 is turned on to close and prevent flow, the solenoid on-off valves PC3, PC4 are disconnected from the hydraulic booster HB and connected to the solenoid on-off valve STR via the proportional pressure reducing valve PV. When the solenoid on-off valve STR is subsequently turned on to allow flow, the solenoid on-off valves PC3, PC4 communicate with the accumulator ACC.

A check valve CV3 is connected in parallel to the solenoid on-off valve PC3 while a check valve CV4 is connected in parallel to the solenoid on-off valve PC4. The flow-in side of the check valve CV3 is connected to the wheel cylinder WrR while the flow-in side of the check valve CV4 is connected to the wheel cylinder WrL. The check valves CV3, CV4 are provided to cause the brake fluid pressure of the wheel cylinders WrR, WrL to quickly follow a decrease of the output pressure of the hydraulic booster HB when the brake pedal BP is released. That is, the check valves CV3, CV4 allow brake fluid to flow toward the solenoid on-off valve SA3 but prevent brake fluid from flowing in the opposite direction. Another check valve CV5 is connected in parallel to the solenoid on-off valve SA3 so that a further depression of the brake pedal BP will provide an increase of the wheel brake pressure even when the solenoid on-off valve SA3 is on to prevent flow.

The solenoid changeover valves SA1, SA2, the solenoid on-off valves SA3, STR and the solenoid on-off valves PC1–PC8 are on-off-controlled by the electronic control unit ECU. For example, during brake steering control (wheel brake pressure distribution control) that is performed while the brake pedal BP is not operated, the solenoid changeover valves SA1, SA2 are switched on to the second position, and the solenoid on-off valve SA3 is switched on to prevent flow, and the solenoid on-off valve STR is switched on to allow flow, because no brake fluid pressure is outputted from either the hydraulic booster HB or the master cylinder MC during the control. A circuit connection state is thereby established in which the fluid pressure in the accumulator ACC of the fluid pressure source PS is supplied to the wheel cylinders WfR, WfL, WrR, WrL via the solenoid on-off valve STR and the opened solenoid on-off valves PC1–PC9. Therefore, the brake fluid pressure can be controlled for quick pressure increase, pulse pressure increase (gradual increase), pressure hold (maintained pressure), pulse pressure decrease (gradual decrease), quick pressure decrease and the like, by repeatedly switching the solenoid on-off valves PC1–PC8 on and off and varying the off-duty ratio of the on-off repetition (the ratio of the off-time to an on-off cycle).

The foregoing will be described in more detail with specific reference to, for example, the solenoid on-off valves PC1, PC5 for controlling the wheel brake pressure in the front right wheel WfR. When the valve PC1 is off to allow flow and the valve PC5 is off to prevent flow, the wheel brake pressure on the front right wheel WfR increases. If the off-duty ratio to the on-off cycle is set to 100%, a continuously maintained off-state is established in which a typical pressure increase is achieved. If the off-duty ratio is set to 0%, a continuously maintained on-state is established in which the valve PC1 is on to prevent flow and the valve PC5 is off to allow flow. In this state, the wheel brake pressure on the front right wheel WfR returns to the reservoir RS through the valve PC5 to thereby achieve a typical quick pressure decrease. Based on the 100% off-duty ratio achieving a quick pressure increase and the 0% off-duty ratio (that is, on-duty ratio of 100%) achieving a quick pressure decrease, it can be simply assumed that ratios equal to or greater than 50% but less than 100% achieve pulse pressure increases (gradual increases), and off-duty ratios less than 50% but greater than 0% achieve pulse pressure decreases (gradual decreases). The pressure hold can be achieved by the valve PC1 being on to prevent flow and the valve PC5 being off to prevent flow.

Reference off-duty ratios are predetermined in one-to-one correspondence to the pressure operations, that is the quick pressure increases, the pulse pressure increase (gradual increase), the pulse pressure decrease (gradual decrease) and the quick pressure decrease. During the wheel brake pressure control, the CPU determines a single mode for the quick pressure increase, the pulse pressure increase (gradual increase), the pressure hold (maintained pressure), the pulse pressure decrease (gradual decrease) or the quick pressure decrease. The CPU then more finely corrects the reference off-duty (a single value) pre-assigned for the mode selected for one of the pressure operations to determine a final off-duty ratio to be used.

In accordance with the thus-determined off-duty ratio, the CPU on-off-controls the solenoid on-off valves PC1, PC5. In the quick pressure increase mode or the pulse pressure increase mode, for example, the CPU on-off-controls the pressure-increasing solenoid on-off valve PC1 and keeps the pressure-reducing solenoid on-off valve PC5 off so that the valve continuously prevents flow. In the quick pressure decrease mode or the pulse pressure decrease mode, the CPU keeps the pressure-increasing solenoid on-off valve PC1 on so that the valve continuously prevents flow and on-off-controls the pressure-reducing solenoid on-off valve PC5. In the pressure hold mode, the CPU keeps the solenoid on-off valve PC1 on so that the valve continuously prevents flow and keeps the solenoid on-off valve PC5 off so that such valve continuously prevents flow.

In a similar manner, the CPU controls the pressure-increasing solenoid on-off valve PC2 and the pressure-reducing solenoid on-off valve PC6 for the front left wheel cylinder, controls the pressure-increasing solenoid on-off valve PC3 and the pressure-reducing solenoid on-off valve PC7 for the rear right wheel cylinder, and controls the pressure-increasing solenoid on-off valve PC4 and the pressure-reducing solenoid on-off valve PC8 for the rear left wheel cylinder.

Figure 3:
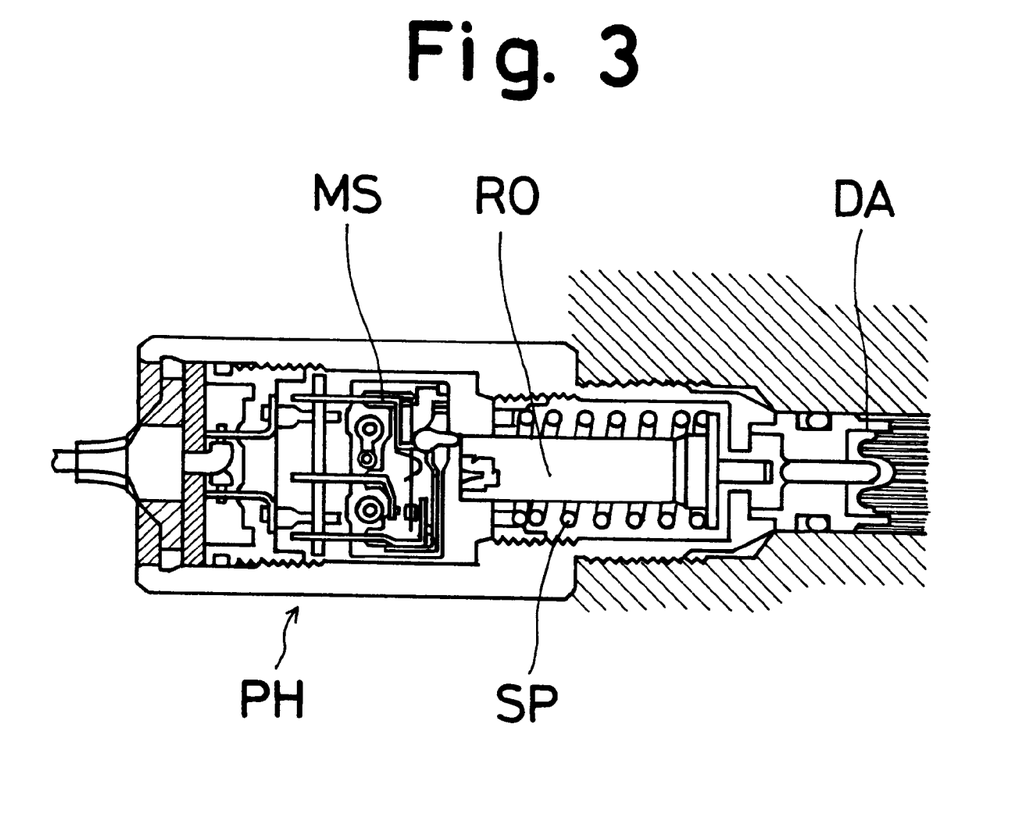
FIG. 3 is an enlarged longitudinal sectional view of the pressure switch used in the present invention.

FIG. 3 shows an enlarged longitudinal sectional view of the pressure switch PH shown in FIGS. 1 and 2. The right side of a diaphragm DA of the pressure switch PH receives a system pressure, that is the pressure from the accumulator ACC. This pressure causes the diaphragm DA and a rod RO to be shifted to the left, as seen with reference to the FIG. 3 illustration, against a compressed coil spring SP to press a microswitch MS so that its contacts switch from an open state to a closed state. This switching to the closed state is caused when the accumulator pressure rises to the pressure P4. While the accumulator pressure rises to the pressure P4, the pressure switch PH is maintained in the closed state. As the pressure from the accumulator ACC decreases, the rod RO and the diaphragm DA are shifted to the right, as seen with reference to the FIG. 3 illustration, by the spring SP. When the accumulator pressure decreases to the pressure P3, the contacts of the microswitch MS switch from the closed state to the open state. While the accumulator pressure is equal to or lower than the pressure P3, the closed state of the microswitch MS is maintained.

Figure 4:
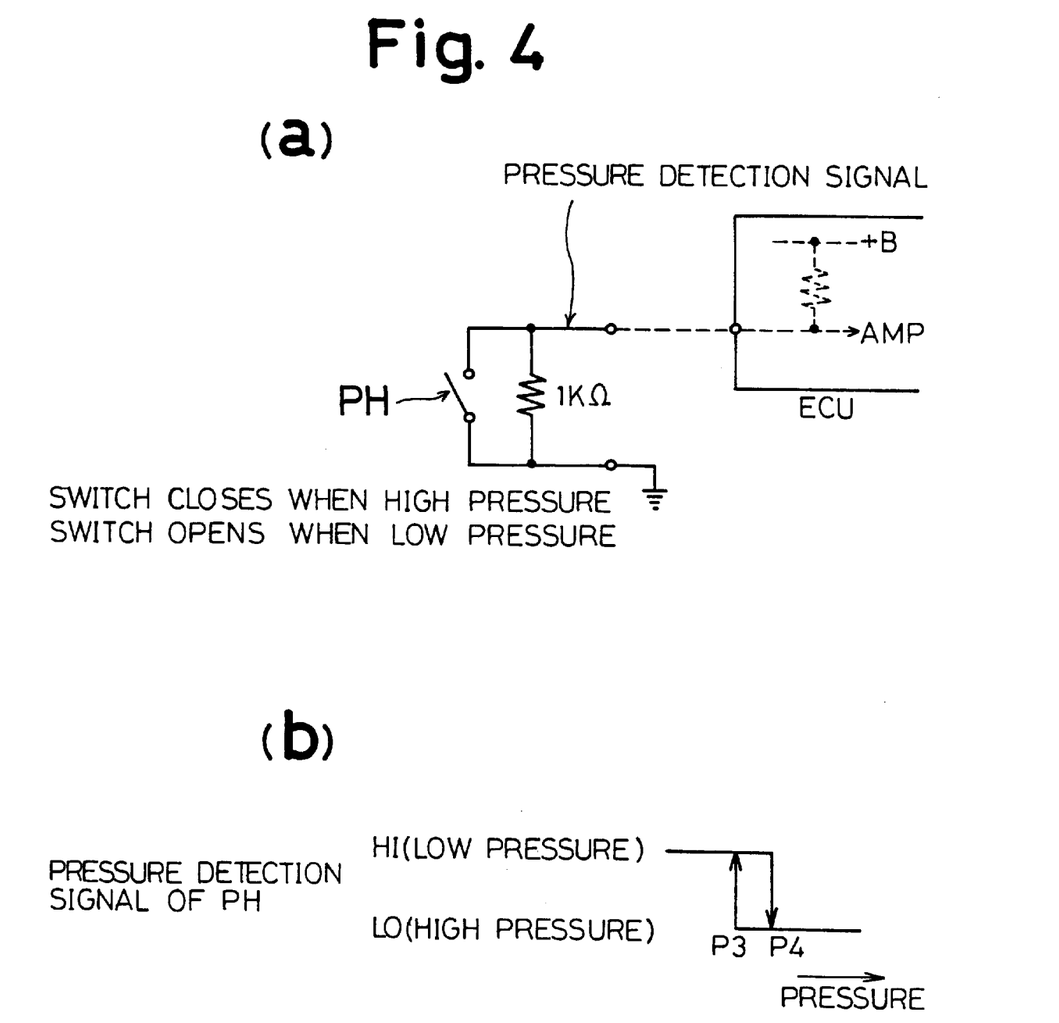
FIG. 4a is an electrical circuitry diagram illustrating a connecting circuit between the pressure switch and the electronic control unit.
FIG. 4b is a graph illustrating the relationship between the accumulator pressure and the level of the pressure detection signal from the pressure switch.

FIG. 4a illustrates the electrical connection between the pressure switch PH and the electronic control unit ECU. In the pressure switch PH, a resistor of 1 kΩ is connected in parallel to the contacts of the microswitch MS. FIG. 4b indicates the output voltage of the pressure switch PH. When the contacts are open (during low pressure), an output voltage occurs between the terminals of the pressure switch PH. When the contacts are closed (during high pressure), the output voltage between the terminals of the pressure switch PH becomes zero. The switching of the contacts actually has a hysteresis characteristic as indicated in FIG. 4b. When the accumulator pressure rises from a low pressure side to a high pressure side, the pressure detection signal of the pressure switch PH switches from a high level HI (open) to a low level LO (closed) at the pressure P4. When the accumulator pressure decreases from a high pressure side to a low pressure side, the pressure detection signal of the pressure switch PH switches from the low level LO (closed) to the high level HI (open) at the pressure P3.

Figure 5:
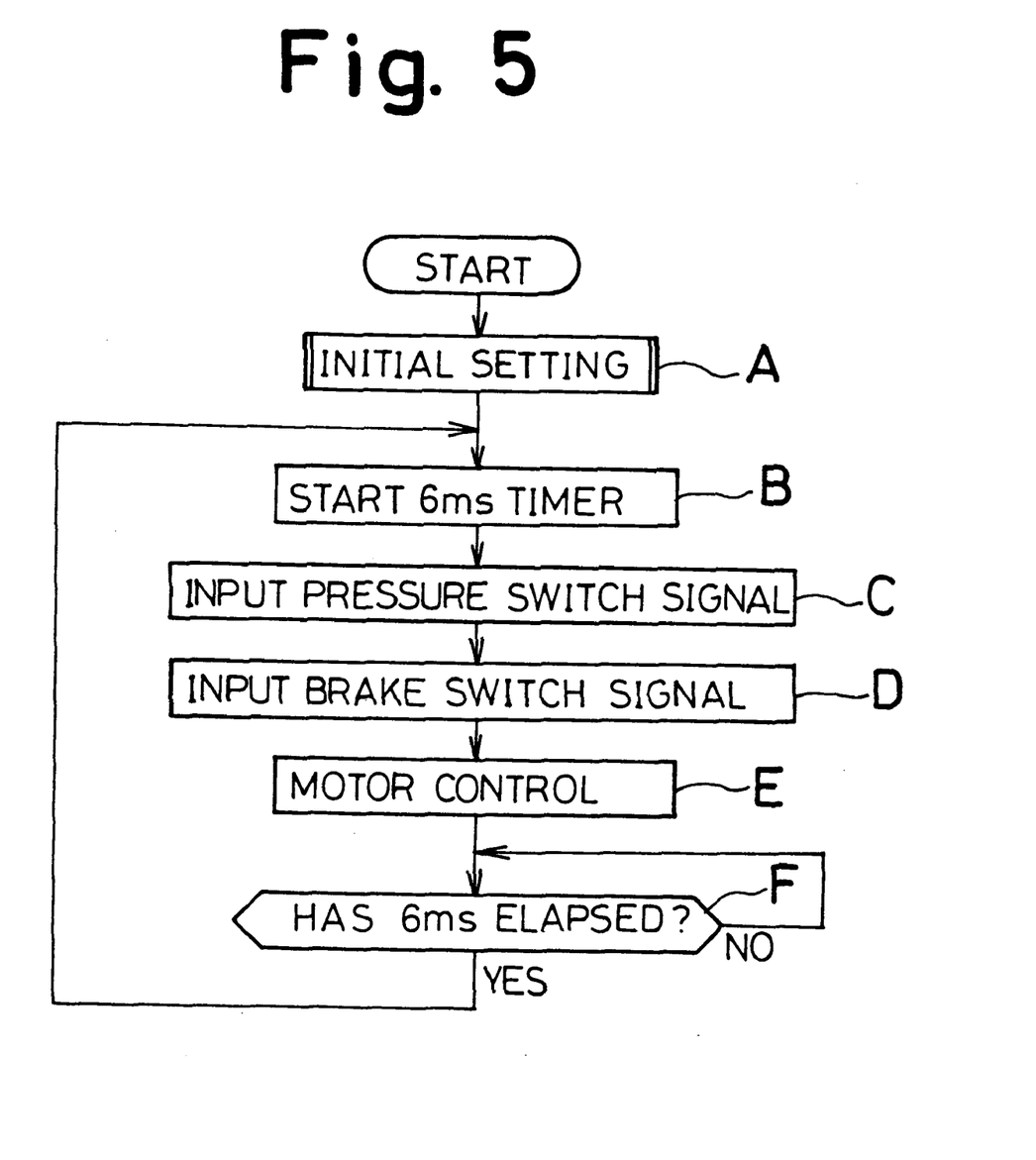
FIG. 5 is a flowchart showing the routine executed by the CPU of a microcomputer of the electronic control unit shown in FIG. 1, with the operation being related to accumulator pressure control.

FIG. 5 illustrates a routine associated with a portion of the pump driving control operation of the CPU of the microcomputer CMP of the electronic control unit ECU, the portion being relevant to the present invention. When powered on, the CPU performs an initial setting in accordance with the system program in step A.

Subsequently, the CPU starts a 6 ms. timer in step B, and reads the detection signal from the pressure switch PH (high level HI indicating low pressure or low level LO indicating high pressure) in step C. In step D the CPU then reads the brake pedal depression signal from the brake switch BS, with a high level H indicating release and a low level L indicating depression. The CPU then performs motor control in step E. After the motor control of step E, the CPU waits for the 6 ms. timer to time out in step F. When the timer times out, the CPU performs steps B–E again in the same sequence. That is, the procedure through steps B–E is repeated in the 6 ms. cycle.

Figure 6:
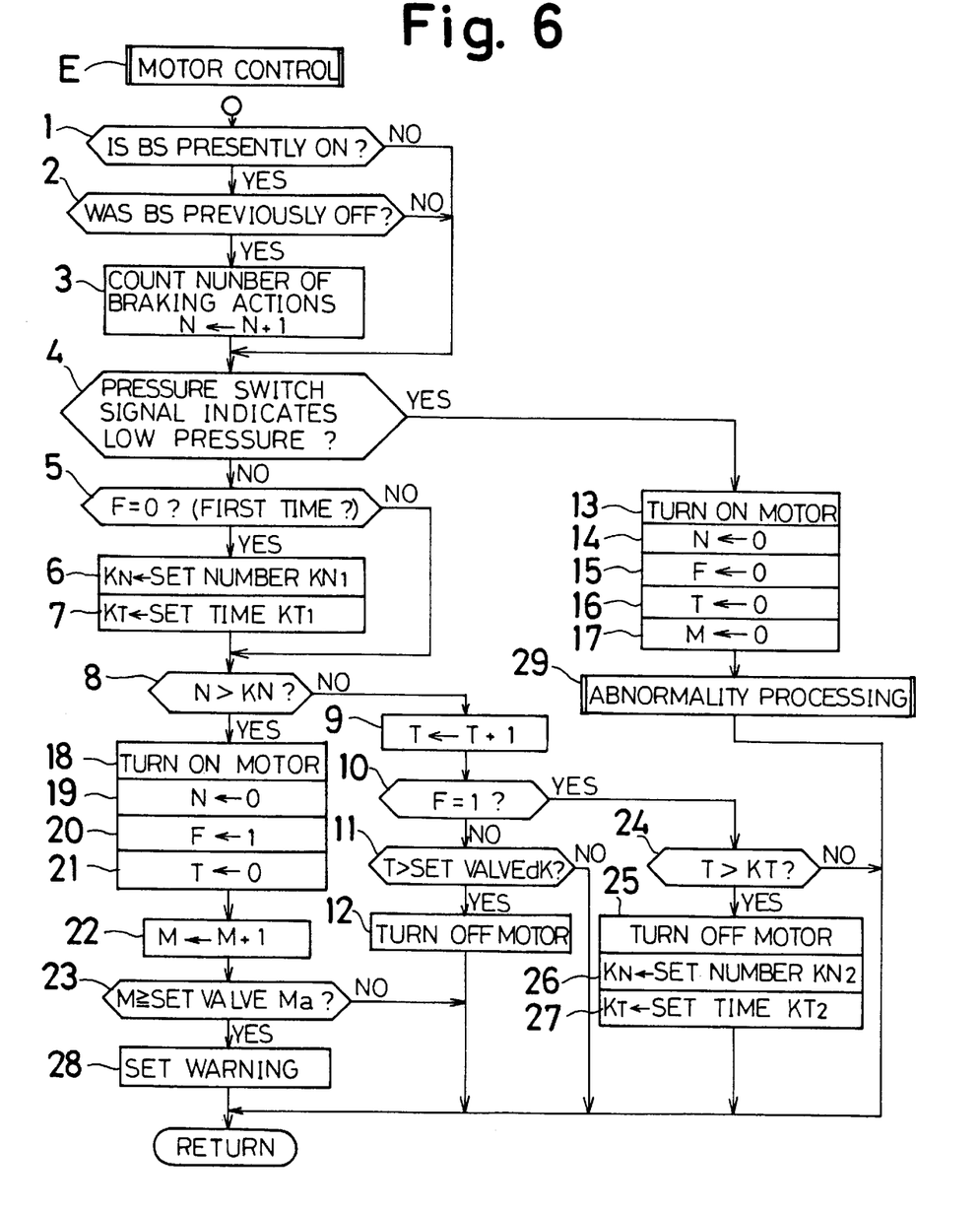
FIG. 6 is a flowchart showing the motor control subroutine performed in the main routine illustrated in the flowchart of FIG. 5.

FIG. 6 illustrates the subroutine details of the motor control performed in step E of the program illustrated in FIG. 5. The processing performed by the CPU during the motor control will be described separately for various operations.

1. Counting of the Number of Depressions of the Brake Pedal

If it is determined in step 1 that the present level of the signal from the brake switch BS is the low level L (i.e., the brake pedal is depressed), the CPU then determines in step 2 whether the previous signal level was the high level H (i.e., if the brake pedal was not depressed). If the previous signal level was the high level H, it is considered that the brake pedal has just been depressed, and the CPU increments the data in a number-of-braking-actions register N by "1" in step 3. If the previous signal level was also the low level L, which means that the brake pedal was already depressed at that time, the CPU does not increment the data in the number-of-braking-actions register N because the number N of depressions of the brake pedal was already incremented by "1" at the time of the switching from a released state to a depressed state which presently continues. The contents or data in the number-of-braking-actions register N indicates the number of brake pedal depressions performed while the pressure switch PH does not detect low pressure, because the data in the number-of-braking-actions register N is cleared at the time of energization of the pump motor M (pump driving being on) in response to detection of a low pressure by the pressure switch PH.

2. Increase of Accumulator Pressure When Pressure Switch Is Normal

If it is determined in step 4 that the pressure detection signal from the pressure switch PH switches from the low level LO (high pressure) to the high level HI (low pressure), meaning that the accumulator pressure has decreased to or below P3, the CPU turns on the motor M in step 13, and clears the registers N, F, T and M in steps 14–17. The pump HP is thereby driven to increase the accumulator pressure. Until the accumulator pressure reaches P4, the CPU performs steps 1–4 and 13–17 during the motor control (step E). When the pressure detection signal from the pressure switch PH switches to the low level LO indicative of high pressure (i.e., when the accumulator pressure reaches P4) the CPU proceeds from step 4 to steps 5 through 11. In step 9, the CPU counts the time T that has elapsed after the switching to the low level LO (high pressure). When it is determined in step 11 that the elapsed time T has become equal to or greater than a predetermined value dK, the CPU stops energizing the motor M (turns off the pump HP) in step 12.

In short, when the pressure switch PH is operating normally, the CPU operates in accordance with the pressure detection signal from the pressure switch PH, that is drives the pump HP if the signal switches to the high level HI (low pressure), and stops driving the pump HP at the lapse of dK×6 ms. after the signal switches to the low level (high pressure).

While the pump HP is being driven, the CPU sets a value KN to an initial value KN1 in step 6, and sets a time KT to an initial value KT1 in step 7. These set values are used to determine the timing for driving and stopping the pump HP if the output from the pressure switch PH is abnormal as described below.

3. Increase of Accumulator Pressure When The Pressure Switch Has Connection Failure In the case of, for example, a connection failure of the pressure switch PH, such as where the contacts of the pressure switch PH will not close despite application of a high pressure to the switch, or where a circuit line of the pressure switch PH is disconnected, the pressure detection signal does not switch to the low level LO (high pressure) but remains at the high-level HI (low pressure) even if the accumulator pressure exceeds P4. In such a case, the driving operation of the pump is continued. To prevent this, abnormality processing is performed in step 29.

Figure 7:
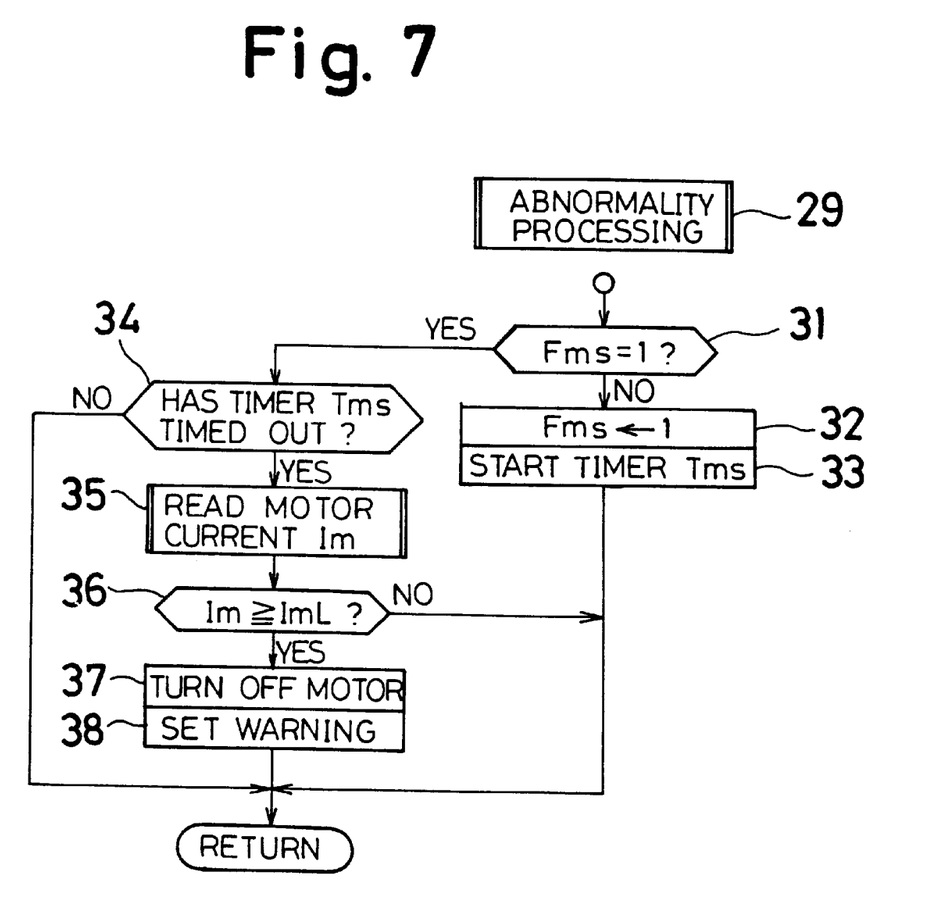
FIG. 7 is a flowchart the abnormality processing subroutine performed in the main routine illustrated in the flowchart of FIG. 6.

The subroutine for the abnormality processing control of step 29 is illustrated in FIG. 7. When the motor M starts to be energized (ON), the CPU writes "1" into a register Fms (indicating start of a timer Tms) in step 32, after determining in step 31 that the data of the register Fms is not "1". The CPU then starts the time Tms in step 33. The time value Tms set in the timer Tms is a time (1 second in this embodiment) which is slightly longer than a delay time (starting time) required until the motor current becomes stable at a value (load current value) corresponding to a load (the accumulator pressure) after the starting period of the motor M has elapsed.

The CPU waits for the timer Tms to time out in step 34. After the timer Tms times out, the CPU reads a value of the current of the motor M (motor current) Im in step 35 every time the CPU enters the abnormality processing of step 29 (in a cycle of 6 ms). The CPU checks in step 36 whether the read current value Im has reached a set value ImL which is substantially equivalent to a value of motor current that occurs when the accumulator pressure is a pressure that is slightly higher than the pressure P4, at which the pressure switch PH switches from the open state (low pressure) to the closed state (high pressure). If the motor current Im reaches the set value ImL, the CPU stops energizing the motor M in step 37, and outputs a warning indicating a pressure switch abnormality in step 38. As long as the motor current Im is less than the set value ImL, the driving of the pump HP is continued (i.e., the motor M remains on).

4. Increase of Accumulator Pressure When Pressure Switch is Short-Circuited

If the pressure detection signal of the pressure switch PH remains at the low level LO (high pressure) and will not switch to the high level Hi (low pressure) despite an accumulator pressure decrease below P3 due to a failure, for example, where the contacts of the pressure switch PH are fused, where the pressure detection signal line is grounded, or other types of failures, the pump driving is not performed in a manner described above in conjunction with the case where the pressure switch PH is normal. Therefore, every time a driver depresses the brake pedal BP, the accumulator pressure is consumed and reduced. The number N of depressions of the brake pedal is counted in steps 1–3.

Referring back to FIG. 6, if the number N of brake pedal depressions exceeds the set value KN (=KN1) while the pressure detection signal from the pressure switch PH remains at the low level LO (high pressure), the CPU turns on the motor M in step 18, clears the register N in step 19, writes "1" into the register F indicating the pump driving during pressure switch signal abnormality in step 20, and clears the register T in step 21. The CPU subsequently increments the data in the register M by "1" in step 22. Since the register N was cleared in step 19 immediately after the motor M was turned on, the number N of brake pedal depressions remains 0 or a small number for some time. Therefore, in the next cycle and later cycles, the CPU determines in step 8 that the number N in the register is not greater than the set value KN and proceeds to step 9.

In step 9, the CPU increments the data of the register by T by "1" to measure the time elapsing after the start of driving the motor M. After checking in step 10 that the value F of the register F is "1", the CPU checks in step 24 whether the elapsed time T (more precisely, T×6 ms.) has exceeded the set time KT (=KT1, more precisely KT1×6 ms.). If so, the CPU immediately turns off the motor M in step 25. The course of pressure changes indicated by points (1) through (5) in FIG. 8 corresponds to the processing described above. After that, the CPU updates the set value KN to KN2 in step 26, and updates the set time KT to KT2 in step 27 so that every time the number N of brake pedal depressions exceeds the set value KN2, the motor M will be turned on for the set time KT2, as indicated by the line through points (5), (6) and (7) in FIG. 8.

If the pressure detection signal of the pressure switch PH continues to be at the low level LO (high pressure), the CPU turns on the motor M in step 18 after the number N of brake pedal depressions has exceeded the set value KN=KN2 determined in step 8. Subsequently, the CPU clears the register N in step 19, writes "1" into the register F indicating the pump driving during pressure switch signal abnormality in step 20, and clears the register T in step 21. The CPU subsequently increments the data of the register M by "1" in step 22 and then proceeds to step 23.

If it is determined in step 23 that the contents in the register M (i.e., the number of times that the pump HP has been driven independently of the pressure detection signal from the pressure switch PH while the pressure detection signal has continued to be at the low level LO (high pressure) and has been considered abnormal) becomes equal to or greater than a predetermined value Ma, the CPU outputs a warning in step 28. After starting the second operation of driving the pump HP independent of the pressure detection signal, the CPU increments the data in the register T by "1" in step 9 in order to measure the time T elapsing after the start of driving the pump. After step 10, the CPU checks in step 24 whether the elapsed time T has exceeded the set timer KT (=KT2). If so, the CPU immediately turns off the motor M in step 25.

The second and later pump driving operations are started every time the number N of brake pedal depressions exceeds KN2 and are stopped after the set time KT2 has elapsed. Therefore, the accumulator pressure is maintained approximately within the range of P2 to P4 indicated in FIG. 8 so that a required accumulator pressure is achieved.

The motor M may also be driven on the basis of the amount of accumulator pressure consumed which is calculated from an output signal of a master cylinder pressure sensor that is provided between the master cylinder and the wheel cylinders. More specifically, the master cylinder fluid pressure where the value of differentiation of the master cylinder fluid pressure is equal to or greater than zero is integrated. If the integrated value exceeds a predetermined value, the motor is driven for a predetermined length of time.

It is also possible to calculate the amount of accumulator pressure consumed, using a pedal stroke sensor or a pedal depressing force sensor.

In the foregoing embodiment, if the pressure detection signal from the pressure switch PH remains at the low level LO (high pressure) and will not switch to the high level HI (low pressure) despite a decrease of the accumulator pressure, due to fusion of the contacts of the pressure switch PH, short circuit of the pressure detection signal line or the like, the CPU automatically controls the driving (ON)/stopping (OFF) of the pump HP in order to keep the accumulator pressure substantially within the range of P2 to P4 (as described above in section no. 4), and then outputs a warning.

Furthermore, if the pressure detection signal remains at the high level HI (low pressure) and will not switch to the low level LO (high pressure) despite an increase in the accumulator pressure, due to fixedly open contacts of the pressure switch PH, disconnection of the pressure detection signal line or the like, the CPU turns off the motor M when the value of current of the motor M rises to a motor load current value that is needed to drive the pump HP until the accumulator pressure becomes a pressure that is slightly higher than P4, thereby avoiding energization of the motor M for an excessively long time and avoiding an excessive pressure in the accumulator.

Therefore, the reliability of the pressure control against a failure of the pressure switch PH or the relevant circuit or the like is ensured even though only one pressure switch is used for the control of pressure accumulation in the accumulator ACC. That is, high reliability is achieved while a minimum pressure detecting device is used, thereby permitting realization of cost reductions.

To summarize, therefore, in accordance with the present invention, the pump control device ECU drives the fluid pump HP, M when the pressure detection signal from the pressure switch PH indicates a low pressure. When the pressure detection signal from the pressure switch PH indicates a high pressure, the pressure increase control device calculates an estimate of the pressure reduction N in the fluid pressure line resulting from fluid pressure consumption in the fluid circuit PC connected to the fluid pressure line. The pressure increase control device drives the fluid pump HP, M for a set length of time (KT=KT1, KT2) when the estimate exceeds a set value (KN=KN1, KN2).

As long as the pressure switch PH normally outputs the pressure detection signal, the pressure in the accumulator is maintained at a level equal to or higher than a set pressure by controlling the driving of the fluid pump that is performed by the pump control device ECU in response to the pressure detection signal. If the pressure switch PH fails and becomes unable to output the pressure detection signal indicating a low pressure, the pressure increase control device ECU calculates an estimate of the pressure reduction N in the fluid pressure line resulting from fluid pressure consumption in the fluid circuit PC connected to the fluid pressure line. When the estimate exceeds a set value (KN=KN1, KN2), the pressure increase control device drives the fluid pump HP, M for a set length of time (KT=KT1, KT2).

Therefore, even if the pressure switch fails so that maintaining a high accumulator pressure based on the detection signal from the pressure switch becomes impossible, a certain pressure within the accumulator is ensured because the pressure increase control device automatically drives the fluid pump when the pressure in the fluid pressure line decreases to a certain level. The construction of the fluid pressure source apparatus requires no additional pressure switch or pressure sensor and, therefore, can be realized at low costs.

The pressure increase control device ECU can also count the number of operations during which high fluid pressure is supplied to a load WfR, WfL, WrR, WrL provided in the fluid pressure circuit PC while the pressure detection signal from the pressure switch PH indicates the existence of a high pressure. When the count value N exceeds a set value (KN=KN1, KN2), the pressure increase control device ECU drives the fluid pump HP, M for a set length of time (KT=KT1, KT2) and resets the count value N.

With this optional construction, while the pressure detection signal from the pressure switch PH remains indicative of a high pressure condition, the fluid pump HP, M is driven to add accumulator pressure for the set length of time (KT=KT1, KT2) every time the number of pressure supplying operations equivalent to the set value (KN=KN1, KN2) is reached. Therefore, a certain accumulator pressure is continuously secured.

Also in accordance with the present invention, in which the pressure switch PH detects either the pressure in the accumulator or the pressure in a fluid pressure line communicating with the accumulator, and a fluid circuit PC supplies fluid pressure in the fluid pressure line to a load WfR, WfL WrR, WrL, a load operation detecting device BS detects the application of a fluid pressure to the load from the fluid circuit PC or HB. When the pressure detection signal from the pressure switch PH indicates a high pressure, the counting device ECU counts the number N of operations during which fluid pressure is applied to the load as detected by the load operation detecting device BS. A first pressure increase control device ECU drives the fluid pump HP, M when the pressure detection signal from the pressure switch PH indicates a low pressure. When the count value N of the counting device ECU exceeds a set value (KN=KN1, KN2), a second pressure increase control device drives the fluid pump HP, M for a set length of time (KT=KT1, KT2) and resets the count value N of the counting device ECU.

As long as the pressure switch PH normally outputs the pressure detection signal, the pressure in the accumulator is maintained at a level equal to or higher than a set pressure by control of the driving of the fluid pump performed by the pump control device ECU in response to the pressure detection signal. If the pressure switch PH fails and becomes unable to output the pressure detection signal indicating a low pressure, the counting device ECU counts the number N of operations during which fluid pressure is applied to the load WfR, WfL, WrR, WrL. When the number N exceeds a set value (KN=KN1, KN2), the second pressure increase control device ECU drives the fluid pump HP, M for a set length of time (KT=KT1, KT2), and resets the count value N of the counting device ECU.

Because the fluid pump HP, M is driven to add an accumulator pressure for the set length of time (KT=KT1, KT2) every time the number of pressure supplying operations equivalent to the set value (KN=KN1, KN2) is reached, a certain accumulator pressure is continuously achieved. Once again, this construction of the fluid pressure source apparatus requires no additional pressure switch or pressure sensor and, therefore, can be produced at a relatively low cost.

The fluid pressure source apparatus may further have a construction wherein when the count value of the counting device exceeds a first set value KN1 which is an initial value of the set value KT, the second pressure increase control device ECU drives the fluid pump HP, M for a first set length of time KT1 which is an initial value of the set length of time KN, and resets the count value N of the counting device. When the count value N of the counting device exceeds a second set value KN2 which is another value of the set value, the second pressure increase control device ECU drives the fluid pump HP, M for a second set length of time KT2 which is another value of the set length of time, and resets the count value N of the counting device. The values KN1, KN2, KT1 and KT2 are predetermined values having the relationships of: KN1>KN2, and KT1 >KT2.

Figure 8:
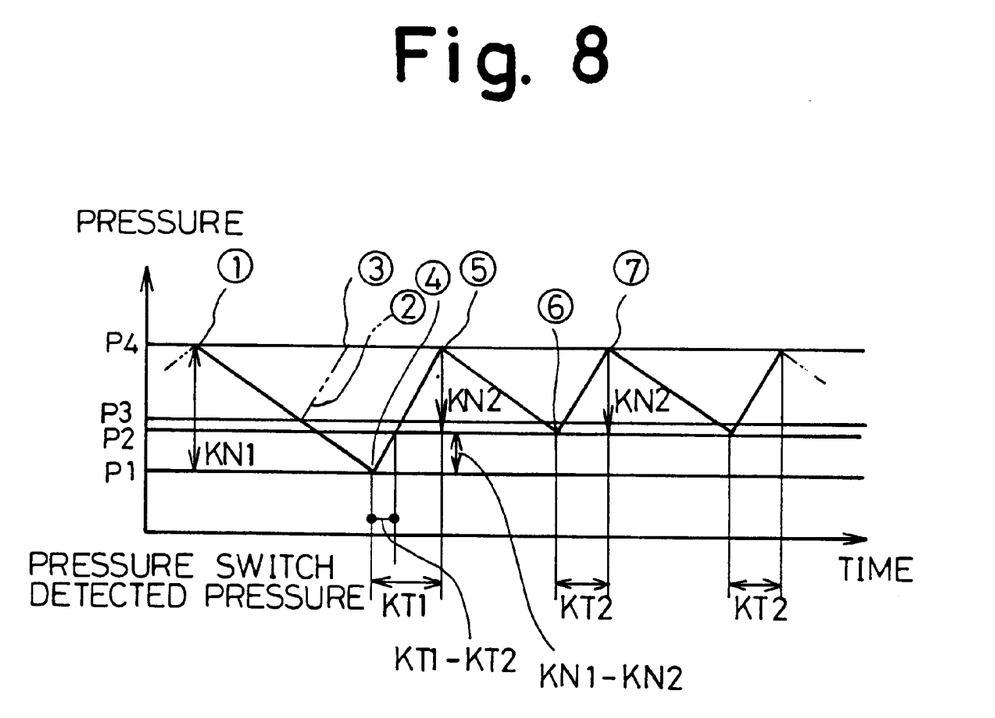
FIG. 8 is a timing chart schematically illustrating pressure changes in the accumulator shown in FIG. 1.

The operation and advantages of this optional construction can be seen with reference to FIG. 8, wherein P4 indicates a pressure level (normal upper limit pressure) at which the indication of the pressure detection signal from the pressure switch PH switches from low pressure to high pressure. The pressure P4 occurring at a point (1) decreases every time a pressure is consumed for a fluid pressure applied to the load (i.e., the pressure P4 decreases as the number of operations of applying a fluid pressure to the load increases). The pressure then reaches a pressure P3 at a point (2). The pressure P3 is a pressure level (normal lower limit pressure) at which the indication of the pressure detection signal from the pressure switch PR switches from high pressure to low pressure. If the pressure switch PH is normal, the switching of the signal causes the fluid pump HP, M to be driven so that the pump operation increases the accumulator pressure as indicated by the two-dot line to a level indicated by a point (3).

If the indication of the pressure detection signal from the pressure switch PH does not switch to low pressure at the point (2) for some reason, the accumulator pressure continues decreasing and reaches a pressure P1 at a point (4) because the pump is not operated. The pressure P1 is estimated from the number N of operations during which fluid pressure is applied to the load, the number N being detected using the load operation detecting device BS and the counting device ECU.

Assuming that the amount of pressure decrease caused in the accumulator ACC during a single operation of fluid pressure application to the load (that is, during the time of a single depressing action of a brake pedal BP) is constant at a value ΔPs, the following equation can be established:

$$P4-P1=\Delta Ps \cdot KN1$$

When the number N of operations of applying a fluid pressure to the load reaches the value KN1, the pump HP, M is driven (as indicated at the point (4)). The accumulator pressure is thereby increased. Provided that the time elapsing after the pump HP, M starts to operate is measured, and that the pump HP, M is stopped when the measured elapse time becomes a time KT1 needed for the accumulator pressure to reach the pressure level P4 from the level P1, the accumulator pressure at the time of stopping the pump HP, M is P4 as indicated at point (5). The fluid pressure is again consumed by the load and gradually reduced over time to the pressure P3.

If the pressure switch PH has failed, the signal switching does not occur at the pressure P3, so that the accumulator pressure continues decreasing and reaches a pressure P2 as indicated at a point (6). The pressure P2 is estimated from the number N of operations of applying a fluid pressure to the load. If the pressure P2 is assumed to be reached based on the estimate, the pump HP, M is driven to increase the accumulator pressure. The time elapsing after the pump HP, M starts to operate is measured. When the measured elapse time becomes a time KT2 needed for the accumulator pressure to rise from P2 to P4, the pump HP, M is stopped. Thereby, the pressure at the time of stopping the pump HP, M is P4 as indicated at a point (7). This accumulator pressure control is continued.

In accordance with the foregoing assumptions and provisions, the accumulator pressure can be maintained within the range P1 to P4 if $$KN1-KN2=\Delta Ps(KT1-KT2).$$

If ΔPs is not constant, apart from the foregoing assumption that the amount of pressure decrease caused in the accumulator ACC during a single operation of fluid pressure application to the load (i.e., during the time of a single depressing action of a brake pedal BP) is constant at a value ΔPs, then the pressures indicated at the points (4)–(7) do not accurately become P1, P2, P4 but shift to the lower pressure side or the higher pressure side. However, even in the case where ΔPs is not constant, the accumulator pressure can be maintained substantially within the range of P2 to P4 by setting the value ΔPs to a statistical mean of individual amounts of pressure consumed for a single operation of applying a fluid pressure to the load. A required accumulator pressure can thus be secured.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A fluid pressure source apparatus comprising:
    a fluid pump;
    an accumulator which receives fluid pressure from the fluid pump;
    a pressure switch for detecting one of a pressure in the accumulator and a pressure in a fluid pressure line communicating with the accumulator;
    pump control means for driving the fluid pump when a pressure detection signal from the pressure switch indicates a low pressure; and
    pressure increase control means for calculating, when a pressure detection signal from the pressure switch indicates a high pressure, an estimate of pressure reduction in the fluid pressure line resulting from a fluid pressure consumption in a fluid circuit connected to the fluid pressure line, the pressure increase control means driving the fluid pump for a set length of time when the estimate exceeds a set value.

2. A fluid pressure source apparatus according to claim 1, wherein, when the pressure detection signal from the pressure switch indicates a high pressure, the pressure increase control means counts a number of operations during which high fluid pressure is supplied to a load provided in the fluid pressure circuit to obtain a count value and, when the number of operations exceeds a set value, the pressure increase control means drives the fluid pump for a set length of time and resets the count value.

3. A fluid pressure source apparatus according to claim 1, wherein the pump includes a motor, and including detecting means for detecting a value of current of the motor.

4. A fluid pressure source apparatus according to claim 3, including means for determining whether the value of current of the motor determined by the detecting means is greater than or equal to a predetermined motor current value.

5. A fluid pressure source apparatus comprising:
    a fluid pump;
    an accumulator which receives fluid pressure from the fluid pump;
    a pressure switch for detecting one of a pressure in the accumulator and a pressure in a fluid pressure line communicating with the accumulator;
    a fluid circuit for supplying the fluid pressure in the fluid pressure line to a load;
    load operation detecting means for detecting application of a fluid pressure to the load from the fluid circuit;
    counting means for counting, when a pressure detection signal from the pressure switch indicates a high pressure, a number of operations during which a fluid pressure is applied to the load as detected by the load operation detecting means to determine a count value;
    first pressure increase control means for driving the fluid pump when the pressure detection signal from the pressure switch indicates a low pressure; and second pressure increase control means for driving the fluid pump for a set length of time and resetting the count value of the counting means when the count value of the counting means exceeds a set value.

6. A fluid pressure source apparatus according to claim 5, wherein when the count value of the counting means exceeds a first set value KN1 which is an initial value of said set value, the second pressure increase control means drives the fluid pump for a first set length of time KT1 which is an initial value of said set length of time and resets the count value of the counting means, and wherein when the count value of the counting means exceeds a second set value KN2 which is another value of said set value, the second pressure increase control means drives the fluid pump for a second set length of time KT2 which is another value of said set length of time and resets the count value of the counting means.

7. A fluid pressure source apparatus according to claim 6, wherein the values KN1, KN2, KT1 and KT2 satisfy the relationships: KN1>KN2, and KT1>KT2.

8. A fluid pressure source apparatus according to claim 5, wherein the pump includes a motor, and including detecting means for detecting a value of current of the motor.

9. A fluid pressure source apparatus according to claim 8, including means for determining whether the value of current of the motor determined by the detecting means is greater than or equal to a predetermined motor current value.

10. A fluid pressure source apparatus comprising:

a fluid pump;

an accumulator which receives fluid pressure from the fluid pump;

a pressure switch for detecting one of a pressure in the accumulator and a pressure in a fluid pressure line communicating with the accumulator;

pump control means for driving the fluid pump when a pressure detection signal from the pressure switch indicates a low pressure; and pressure increase control means for calculating, when a pressure detection signal from the pressure switch indicates a high pressure, an estimate of pressure reduction in the fluid pressure line resulting from a fluid pressure consumption in a fluid circuit connected to the fluid pressure line based on a number of brake operations, the pressure increase control means driving the fluid pump for a set length of time when the estimate exceeds a set value.

11. A fluid pressure source apparatus according to claim 10, wherein, when the pressure detection signal from the pressure switch indicates a high pressure, the pressure increase control means counts a number of operations during which high fluid pressure is supplied to a load provided in the fluid pressure circuit to obtain a count value and, when the number of operations exceeds a set value, the pressure increase control means drives the fluid pump for a set length of time and resets the count value.

12. A fluid pressure source apparatus according to claim 10, wherein the pump includes a motor, and including detecting means for detecting a value of current of the motor.

13. A fluid pressure source apparatus according to claim 12, including means for determining whether the value of current of the motor determined by the detecting means is greater than or equal to a predetermined motor current value.

* * * * *